Sept. 14, 1965 A. E. SNOWDON 3,206,623
ELECTRIC SYNCHRONOUS INDUCTOR MOTOR
Filed April 20, 1962
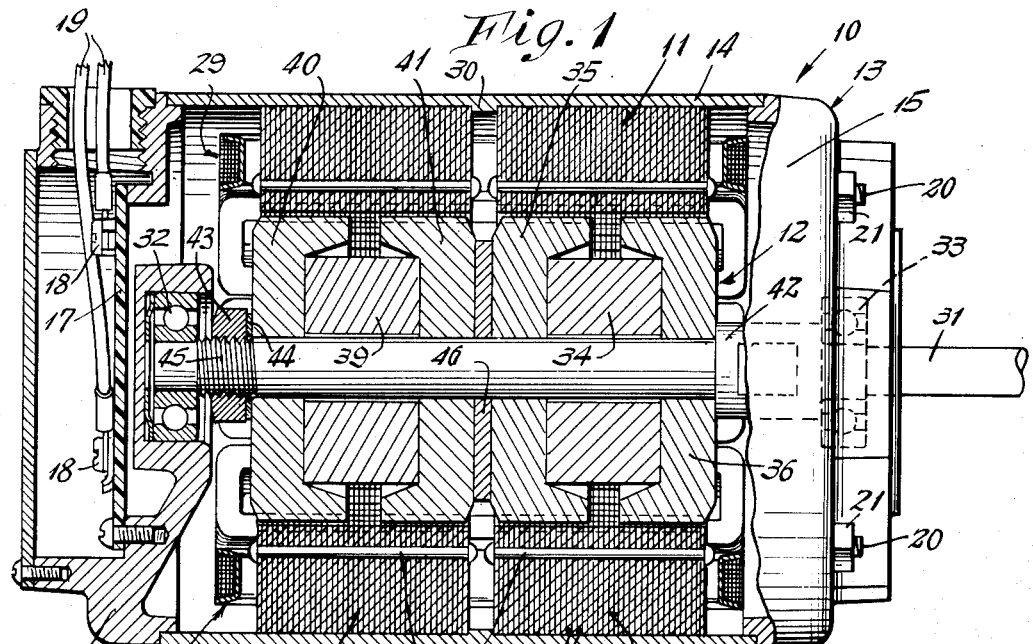
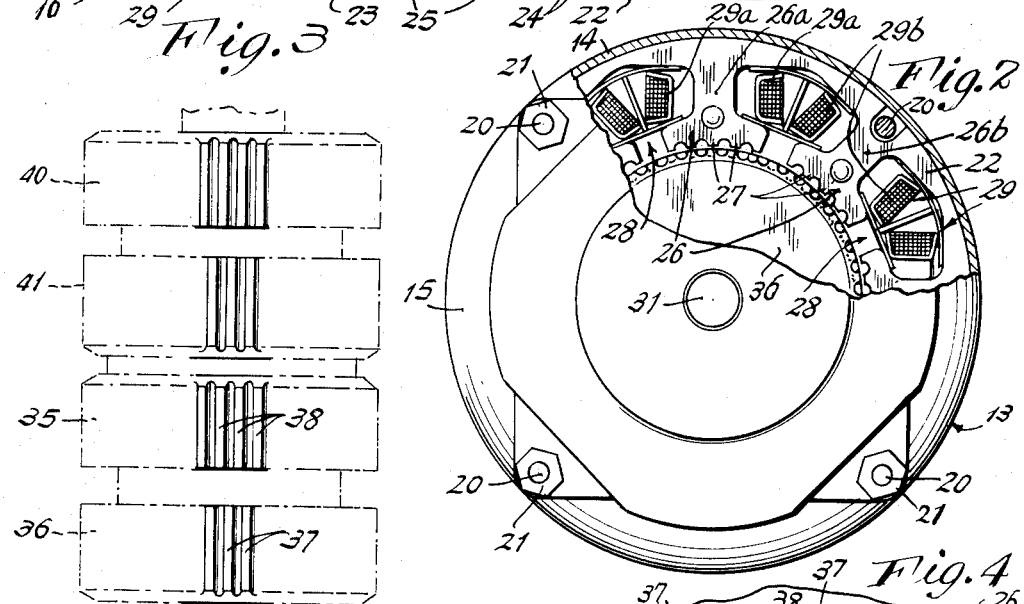
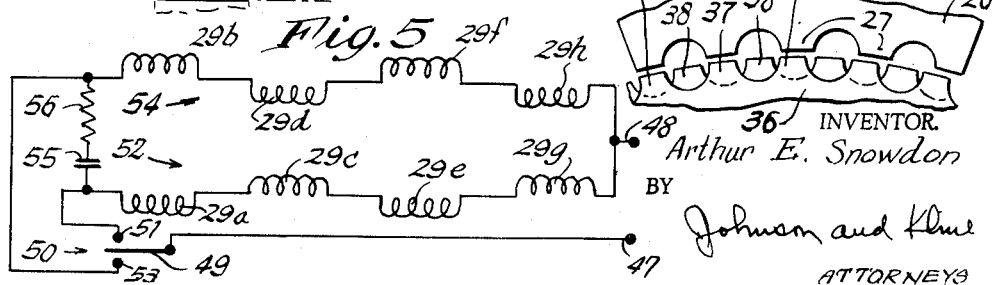
INVENTOR.
Arthur E. Snowdon
BY
Johnson and Kline
ATTORNEYS

United States Patent Office 3,206,623
Patented Sept. 14, 1965

3,206,623
ELECTRIC SYNCHRONOUS INDUCTOR MOTOR
Arthur E. Snowdon, Bristol, Conn., assignor to The Superior Electric Company, Bristol, Conn., a corporation of Connecticut
Filed Apr. 20, 1962, Ser. No. 189,079
3 Claims. (Cl. 310—162)

The present invention relates to an electric motor and more particularly to a motor of the synchronous inductor type.

In United States Patents No. 2,931,929 and No. 2,982,872 there are disclosed electric motors of the same type as to which the present invention pertains. These motors have the characteristics of rotating at a speed related to the frequency of the energizing current which may be either an alternating current or a pulsating current, of being easily rotated in the other direction by changing the polarity of energization, of being substantially instantaneously stopped and of being held braked at the stopped position. These motors have been extremely satisfactory but increasing usage has developed the need for such a motor that has a larger output torque, which also may be economically manufactured and yet retains the same above-noted characteristics.

It is accordingly an object of the present invention to provide an electric motor of the synchronous inductor type having the above characteristics but yet which has an increased power output over similar sized motors.

Another object of the present invention is to provide a motor of the above type in which, even though there is a larger increase in output torque, there is an increase in efficiency and substantially only the same power is required as that used by a much smaller output torque motor.

An additional object of the present invention is to achieve the above-noted objects in an electric motor which retains the desired characteristics yet is economical to manufacture and reliable in use.

A further object of the present invention is to provide an electric motor which employs a substantial number of parts that have heretofore been used in smaller motors but yet which achieves the above objects.

In carrying out the present invention there is provided an electric motor having a stator assembly composed of a first pole forming member and a second pole forming member identical to the first and mounted to be axially aligned but axially displaced from each other in a casing. The pole forming members are magnetically polarized by windings inductively associated therewith and, according to the present invention, each winding is inductively associated with both pole forming members. Cooperating with the stator is a rotor assembly having a rotatable shaft on which is mounted a first permanent magnet having an end cap at each end so that the magnet magnetizes the end caps with a different polarity and also mounted on the same shaft is a second permanent magnet also having end caps. Both of the magnets and all the end caps are substantially identical. The end caps and the pole forming members are axially aligned so that mating teeth formed on the periphery of the end caps and on the inner periphery of the pole forming members magnetically cooperate to move the shaft upon changes in energization of the windings.

While the motor of the present invention may superficially appear to be merely a multiplication of the presently known smaller motor, namely where each smaller motor has a stator of one pole forming member and a rotor of one magnet with its associated end caps cooperating therewith, the present motor is surprisingly and unexpectedly more efficient than the heretofore known smaller motors because it produces a substantially larger torque or output power but yet requires only substantially the same amount of current and hence electrical power input. More specifically comparing the present motor with the presently known smaller motor, the motor of the present invention has a power output rated by the manufacturer at 400 oz.-in. with a current requirement of .6 ampere at 120 volts, while the smaller motor employing many identical parts, the parts being hereinafter specifically pointed out, is rated by the same manufacturer at 250 oz.-in. and yet requires the same .6 ampere at 120 volts. Accordingly, the motor of the present invention thus requires only substantially the same amount of current as a 250 oz.-in. rated motor but surprisingly has 400 oz.-in. of rated output power. Moreover, the desirable characteristics of speed constant with frequency, reversibility and substantially instant stopping of the smaller motor are maintained.

Other features and advantages will hereinafter appear.

In the drawing:

FIGURE 1 is an elevation of the electric motor of the present invention with a substantial portion shown in axial cross-section.

FIG. 2 is an end view of the motor of FIG. 1 with a portion of the casing broken away.

FIG. 3 is a pictorial representation of the rotor assembly.

FIG. 4 is a detail showing one position of the rotor and stator teeth, said detail being taken on either the line 4A or 4B, as they are identical.

FIG. 5 is an electrical schematic diagram of the electrical connections of the present invention.

Referring to the drawing, the electric motor of the present invention is generally indicated by the reference numeral 10 and includes a stator 11 and a rotor 12. A casing 13 is formed of an annular part 14 having at one end an end bell 15 and at its other end another end bell 16. The end bell 16 includes an insulating disk 17 on which are mounted connectors 18 to which electrical power lead wires 19 are connected. The two end bells and the frame are secured together by bolts 20 extending therebetween and having cooperating nuts 21.

Secured to the interior of the annular part 14 of the casing 13 is a first pole forming member 22 and a second pole forming member 23. Both pole forming members 22 and 23 are each composed of a plurality of identical laminations 24 of magnetizable material secured together to form a unitary member as by rivets 25.

Referring to FIG. 2, the pole forming member 22 is annular in shape and is formed to provide a plurality of inwardly extending pole pieces 26, there being in the specific embodiment herein described eight pole pieces spaced equally about the inner periphery of the pole forming member 22. The inner periphery of each of the pole pieces 26 is arcuate and is provided with equally spaced teeth 27 while the pole pieces are separated sufficiently from each other to form winding slots 28 in which windings, generally indicated by the reference numeral 29, are positioned. Each winding is composed of a length of wire that is wound into a multi-turn rectangular loop in the embodiment herein described though if desired may be formed of two such rectangular loops. A winding 29a is employed to magnetize the pole piece 26a, a winding 29b is employed to magnetize the pole piece 26b, etc., there being one winding for each pole piece with the pole piece being within the loop in which the winding is formed.

The pole forming member 23 is identical to the pole forming member 22 and is mounted in the casing 13 to be axially aligned with the pole forming member 22 and to have each of the pole pieces thereof also aligned so that teeth formed in the peripheries of the pole pieces of both pole forming members are thus axially aligned.

As shown in FIG. 1, the two pole forming members 22 and 23 are spaced apart slightly by an annular abutment 30 formed integrally in the annular part 14. Preferably the pole forming members are by being force fitted to the annular part 14 secured to the casing though if desired other securing means may be employed. As the pole forming member 23 is identical to the pole forming member 22, it has pole pieces and winding slots and according to the present invention each of the windings 29a and 29b, etc. encircles not only a pole piece of the pole forming member 22 but encloses the identical pole piece of the pole forming member 23 such that each winding will thereby magnetize, with the same polarity, each pole piece of the member 22 with which it is associated and also the corresponding pole piece of pole forming member 23.

The rotor assembly 12 includes a shaft 31 rotatably mounted on ball bearings 32 and 33 secured to the end bells 15 and 16 respectively. Mounted on the shaft 31 is a permanent magnet 34 which is magnetized axially in order to produce magnetization of one polarity in an end cap 35 secured on the shaft adjacent one end of the magnet 34 and a magnetic polarity of the other polarity in an end cap 36 also secured on the shaft at the other end of the permanent magnet 34. Each end cap, as shown in FIGS. 2 and 3 in the specific embodiment of the present invention disclosed herein, is formed of a unitary piece of sintered paramagnetic iron though, if desired, may be formed of laminated sheets of magnetizable iron secured together. The periphery of each end cap is formed to have periphery teeth 37 for the end cap 36 and teeth 38 for the end cap 35. As shown in FIG. 4, each tooth is identical and equally spaced on each end cap and the end caps are identical but the end cap 35 is secured on the shaft 31 so that its teeth are axially displaced one-half a tooth pitch from the teeth 37 of the end cap 36.

The rotor further includes another permanent magnet 39 secured thereon and having end caps 40 and 41 with these elements 39, 40 and 41 being identical to the magnet 34 and the end caps 35 and 36. The teeth of the end cap 40 by the positioning of the end caps on the shaft are axially displaced one-half a tooth pitch from the teeth of the end cap 41 while the teeth of the end cap 41 and the teeth of the end cap 36 are axially aligned as are the teeth of the end caps 36 and 40. Thus by the polarity of the magnets 34 and 39 the end caps 35 and 40 have the same magnetic polarity while the end caps 36 and 41 have the same magnetic polarity.

While the end caps and magnets may be secured to the shaft in any desired manner, according to the present invention, the shaft 31 is provided with a hub 42 against which bears the end cap 36 while a nut 43 and washer 44 are threadingly engaged on a threaded portion 45 of the shaft 31 to enable axial compression of the end caps and magnet. It is also desired that the end caps be force fitted onto the shaft to obviate relative movement between the end caps and the shaft. Moreover, according to the present invention, there is positioned between the end caps 35 and 41 a spacing washer 46. This washer is made from non-magnetizable material such as aluminum and is substantially coextensive with the surfaces of the end caps 35 and 41 which it abuts and thus is employed to maintain radial alignment of the magnets and end caps on the shaft to thereby prevent canting but to also serve to magnetically isolate the end cap 35 from the end cap 41.

As shown in FIG. 1, the rotor is mounted in the stator to have the teeth of the end caps 35 and 36 radially aligned with the pole forming member 22 while the peripheral surfaces on which the teeth are formed in the end caps 40 and 41 are radially aligned with the pole forming member 23.

Referring to the electrical schematic diagram, there is provided input terminals 47 and 48 connected to the winding 29. The input terminal 47 is connected to an arm 49 of a switch 50 having a contact 51 connected to a set of windings 52 while another contact 53 of switch 50 is connected to a set of windings 54. Connected across the contacts is a phase shifting means consisting of a condenser 55 and a resistance 56. The windings 29 are eight in number in the motor herein disclosed and hence the winding set 52 has four windings, namely 29a, 29c, 29e and 29g while the winding set 54 also has four windings 29b, 29d, 29f and 29h. The windings of the winding set 52 are inductively coupled by being disposed about alternate pole pieces clockwise about the pole forming members 22 and 23 while the windings of the winding set 54 are disposed about the intermediate pole pieces.

In the operation of the present motor, it functions identically with the heretofore known type of smaller motor such that upon connecting the input terminals 47 and 48 to a source of alternating or reversing pulsating current, movement of the contact arm 49 into engagement with the contact 51 will effect rotation of the motor in one direction while engagement of the arm 49 with the other contact 53 will effect rotation of the motor in the other direction, both rotations being at a constant speed depending upon the frequency of the source current. Moreover it is within the scope of the present invention that if desired switching circuits providing currents of the correct phase may be employed to energize the windings.

The motor of the present invention employs parts identical to that employed in the heretofore mentioned motor which produces 250 oz.-in. of power. Thus for example the magnets 34 and 39, the end caps 35, 36, 40 and 41 and the pole forming members 22 and 23 are all identical. However, even with this same identicalness, the motor of the present invention is capable of producing an output torque of 400 oz.-in., a 60 percent increase in torque over the output of the smaller motor using similar parts. But surprisingly, as heretofore pointed out, only substantially the same input current is required for the motor of the present invention than that required for the smaller motor. Thus the present invention provides an electric motor which employs parts that are the same as in heretofore known smaller powered motors but produces an increased output without an increase in current consumption at the same voltage.

It will accordingly be appreciated that there has been disclosed an electric motor of the synchronous inductor type which retains the desirable characteristics of this type motor, namely the ability to rotate in synchronism with the frequency of the energization to be reversibly rotatable and of being braked at a stopped position but yet produces an output torque which is substantially larger than the heretofore known smaller motors. While many parts are identical between a smaller motor and the motor of the present invention, the motor of the present invention requires only substantially the same amount of current as that required by a smaller motor even though it produces approximately a 60 percent increase in output torque over the output torque of the smaller motor.

Variations and modifications may be made within the scope of the claims and portions of the improvements may be used without others.

I claim:

1. An electric motor of the synchronous inductor type comprising a rotor and a stator; said stator comprising a first annular pole forming member and a second annular pole forming member identical to the first, winding means magnetically coupled to the pole forming members and adapted to be energized by electric current to magnetize the pole forming members, said winding means comprising a plurality of coils with each coil being magnetically coupled to both pole forming members, said pole forming members having a plurality of radially inwardly projecting pole pieces with the inner ends of the pole pieces being formed with equally spaced teeth; said rotor comprising a shaft, a first permanent magnet magnetized axially mounted on said shaft, first end caps secured on said shaft one at each end of the permanent magnet to be magnetized by said magnet, a second permanent magnet magnetized axially mounted on said shaft, second end caps secured on said shaft one at each end of the permanent magnet to be magnetized by said magnet, the periphery of each of said end caps being formed with equally spaced teeth; and the rotor being positioned within the stator with the first end caps being radially aligned with the pole pieces of the first pole forming member to form magnetic paths therebetween and the second end caps being radially aligned with the pole pieces of the second pole forming member to form magnetic paths therebetween, the magnetic paths of the first rotor and first pole forming member being apart from the magnetic paths of the second rotor and second pole forming member.

2. An electric motor of the synchronous inductor type comprising a rotor and a stator; said stator comprising a first annular pole forming member and a second annular pole forming member identical to the first, winding means magnetically coupled to the pole forming members and adapted to be energized by electric current to magnetize the pole forming members, said pole forming members having a plurality of radially inwardly projecting pole pieces with the inner ends of the pole pieces being formed with equally spaced teeth, said teeth of the pole pieces of each pole forming member being axially aligned and the teeth of both pole forming members being axially aligned; said rotor comprising a shaft, a first permanent magnet magnetized axially mounted on said shaft, first end caps secured on said shaft one at each end of the permanent magnet to be magnetized by said magnet, a second permanent magnet magnetized axially mounted on said shaft, second end caps secured on said shaft one at each end of the permanent magnet to be magnetized by said magnet, the periphery of each of said end caps being formed with equally spaced teeth with the teeth of alternate end caps being axially aligned and the teeth of adjacent end caps being displaced one half a tooth; and the rotor being positioned within the stator within the first end caps being radially aligned with the pole pieces of the first pole forming member and the second end caps being radially aligned with the pole pieces of the second pole forming member.

3. An electric motor of the synchronous inductor type comprising a rotor and a stator; said stator comprising a first annular pole forming member and a second annular pole forming member identical to the first, said pole forming members being spaced apart but axially aligned, winding means magnetically coupled to the pole forming members and adapted to be energized by electric current to magnetize the pole forming members, said winding means comprising a plurality of coils with each coil being magnetically coupled to both pole forming members, said pole forming members having a plurality of radially inwardly projecting pole pieces with the inner ends of the pole pieces being formed with equally spaced teeth; said rotor comprising a shaft, a first permanent magnet magnetized axially mounted on said shaft, first end caps secured on said shaft one at each end of the permanent magnet to be magnetized by said magnet, a second permanent magnet magnetized axially mounted on said shaft, second end caps secured on said shaft one at each end of the permanent magnet to be magnetized by said magnet, both the first and second magnets being mounted to have their polarity of magnetization extend in the same direction, spacer means positioned between a first end cap and an adjacent second end cap, said spacer means extending substantially coexistensive with the end caps and being formed of non-magnetic material to thereby maintain alignment of the end caps and magnetically space them, the periphery of each of said end caps being formed with equally spaced teeth; and the rotor being positioned within the stator with the first end caps being radially aligned with the pole pieces of the first pole forming member to form magnetic paths therebetween and the second end caps being radially aligned with the pole pieces of the second pole forming member to form magnetic paths therebetween, the magnetic paths of the first rotor and first pole forming member being apart from the magnetic paths of the second rotor and second pole forming member.

References Cited by the Examiner

UNITED STATES PATENTS

| | | | |
|---|---|---|---|
| 2,548,633 | 4/51 | Stephenson | 310—164 |
| 2,931,929 | 4/60 | Snowdon et al. | 310—156 |
| 2,982,872 | 5/61 | Fredrickson | 310—156 |

MILTON O. HIRSHFIELD, *Primary Examiner.*